United States Patent [19]

Lerman

[11] Patent Number: 5,604,789

[45] Date of Patent: Feb. 18, 1997

[54] METHOD AND SYSTEM FOR PROVIDING A DIGITAL WIRELESS LOCAL LOOP

[75] Inventor: Ruvin I. Lerman, Longmont, Colo.

[73] Assignee: U S West Technologies, Inc., Boulder, Colo.

[21] Appl. No.: 349,769

[22] Filed: Dec. 6, 1994

Related U.S. Application Data

[63] Continuation-in-part of Ser. No. 270,070, Jul. 1, 1994.

[51] Int. Cl.$^6$ .................................................... H04Q 7/30
[52] U.S. Cl. .............................. 379/59; 455/20; 455/33.1
[58] Field of Search ........................ 379/58, 59; 455/33.1, 455/54.1, 33.4, 56.1, 11.1, 20, 22, 15, 16

[56] References Cited

U.S. PATENT DOCUMENTS

| | | | |
|---|---|---|---|
| 4,989,230 | 1/1991 | Gillig et al. | 379/59 |
| 5,235,632 | 8/1993 | Raith | 379/59 |
| 5,349,631 | 9/1994 | Lee | 379/59 |
| 5,402,523 | 3/1995 | Berg | 455/56.1 X |
| 5,404,570 | 4/1995 | Charas et al. | 455/56.1 X |
| 5,437,054 | 7/1995 | Rappaport et al. | 455/33.1 |
| 5,438,608 | 8/1995 | Kojima | 379/58 |
| 5,475,735 | 12/1995 | Williams et al. | 379/59 |

OTHER PUBLICATIONS

"The GSM System for Mobile Communications", Michel Mouly and Marie–Bernadette Pautet, pp. 64–71, 444–447, 464–467. 1992.

*Primary Examiner*—Wing F. Chan
*Assistant Examiner*—William G. Trost
*Attorney, Agent, or Firm*—Brooks & Kushman

[57] ABSTRACT

A method and system for providing a digital wireless local loop for use by a wireless transceiver, e.g., a portable handset, in an indoor environment utilizing an outdoor base transceiver. Upon determining that the portable handset is located in an outdoor environment, the base transceiver and the portable handset communicate over one of a first plurality of frequencies. The outdoor portable handset is prohibited from transmitting and receiving signals over frequencies other than the first plurality of frequencies. Upon determining that the portable handset is located in an indoor environment, the base transceiver first transmits the communication signal to a first converter at one of a second plurality of frequencies different from the first plurality of frequencies. The first converter then converts the frequency to a predetermined conversion frequency different from the first and second plurality of frequencies. The signal is then transmitted to a second converter located in the indoor environment over the predetermined conversion frequency. The second converter shifts the frequency of the signal back to the one of the second plurality of frequencies and transmits the signal to the portable handset.

17 Claims, 3 Drawing Sheets

METHOD AND SYSTEM FOR PROVIDING A DIGITAL WIRELESS LOCAL LOOP

CROSS-REFERENCE TO RELATED APPLICATION

The present application is a continuation-in-part of U.S. patent application Ser. No. 08/270,070, filed Jul. 1, 1994, titled "Method And System For Providing A Digital Wireless Local Loop."

TECHNICAL FIELD

This invention relates to cellular wireless local loops. In particular, this invention relates to digital wireless local loops derived from an outdoor cellular base transceiver for use by a portable handset or a device incorporating handset functionality operating in an indoor environment. The invention is particularly suited for single or multi-family dwellings or a multi-use building environment.

BACKGROUND ART

Most metropolitan areas are now equipped with one or more forms of wireless communications networks which provide radio transmissions in the microwave frequency band to wireless telephone customers. For example, a plurality of base transceivers capable of transmitting and receiving radio communication signals to and from one or more portable handsets are located throughout various wireless service areas. A portable handset, as the term is used herein, refers to a wireless voice telephone such as a cellular telephone or a cordless telephone or the like in a speech or data mode that can be installed at a fixed location in an indoor environment, temporarily installed in a vehicle or be completely mobile. In the case of cellular telephones, a typical cellular service area comprises a metropolitan area or larger region.

An example illustrating two possible configurations of a cellular service area comprised of segments 10a, 10b is shown in FIG. 1. The segment 10a illustrates a seven-cell reuse pattern; i.e., the frequency band allocated to cellular telephone customers is divided into seven macrocells 12 operating at seven different frequency channels F1–F7. The frequency channels F1–F7 typically are not consecutive frequencies of the cellular radio frequency band. For example, frequency channel F1 may comprise channels 1, 3 and 5, while frequency channel F2 may comprise channels 2, 4 and 6. The seven frequency channels F1–F7 are repeated for each segment 10a of the entire cellular service area. The cellular service area 10b illustrates a twelve cell site reuse pattern.

Service area 10b has reduced capacity per coverage area since the cellular frequency band is divided into twelve macrocells 12, and hence twelve frequency channels F1–F12, as opposed to the seven frequency channels F1–F7 of segment 10a. However, the larger segment 10b provides a greater distance between macrocells 12 that use the same frequency channel, resulting in reduced co-channel interference, e.g., frequency channel F6 of segment 10b versus frequency channel F6 of segment 11b.

Located within each macrocell 12 is a base transceiver 14. Each base transceiver 14 is able to broadcast and receive radio signals utilizing its corresponding frequency channel. For example, a base transceiver 14 located in segment 10a would transmit and receive radio signals from a wireless transceiver utilizing frequency channels F4 while adjacent base transceivers 14 would operate at frequency channels F1, F2, F3, F5, F6 and F7.

When a telephone call to a wireless transceiver originates from either another wireless transceiver or a land-based telephone via a Public Switched Telephone Network (PSTN) 15, a caller must access a Mobile Telephone Switching Center (MSC) 16. The MSC 16 receives the call request and instructs a central call processor 17 to begin call processing. The central call processor 17 transmits a signal over a dedicated line 18 (such as a land-based line or microwave link, etc.) to a predetermined base transceiver 14. The central call processor 17 determines which base transceiver 14 to transmit the signal based on the location of the portable handset. When the portable handset enters a macrocell 12, the portable handset registers its location with a corresponding home or visitor location register. The control call processor 17 has access to the registers and, therefore, directs the telephone call to the appropriate base transceiver 14.

Portable handsets can be used indoors as well as outdoors. Therefore, a portable handset located in an indoor environment requires service from a base transceiver 14 located outdoors. The indoor portable handset can communicate directly with an outdoor base transceiver 14 if both the base transceiver 14 and the portable handsets are allowed to exert sufficient power to penetrate the walls of a building. However, the more power a base transceiver 14 or a wireless transceiver transmits the more interference it causes to other base transceivers 14 as well as the associated portable handsets which are assigned the same frequencies.

Consequently, a need has developed for a wireless transmission system and, in particular, wireless local loops or links (WLL) which utilize the attenuation properties of buildings within their associated service areas. A WLL is a wireless link which connects an indoor cellular portable handset or a customer premises wired standard telephone to an outdoor cellular base transceiver on demand. Such a system should permit the buildings to act as shields so as to isolate outdoor users as well as the user's respective base transceiver 14 from interference caused by the indoor WLL. Still further, the WLL should allow users to make inexpensive local calls using the same portable handsets which were used to make expensive outdoor calls. Further, the WLL should provide indoor communication quality for users of outdoor portable handsets when the users transfer to indoor environments.

Indoor coverage by an outdoor base transceiver requires a device that compensates for most of the indoor propagation loss due to the attenuation properties of the building. The indoor propagation loss can be as high as 90 dB. A device such as an on-frequency repeater can be utilized to recover the indoor propagation loss if the repeater's directive antennas are professionally installed and reflectors are not located in close vicinity to the repeater's antennas. This requirement can rarely be guaranteed when a consumer-installed Customer Premises Equipment (CPE) is utilized.

One known method of improving indoor coverage for portable handsets includes utilizing an expensive Frequency Shifting Repeater (FSR) that resembles two back-to-back base transceivers. The first base transceiver receives a signal from the outdoor base transceiver, demodulates the signal to a baseband form including error correction and speech processing, and then sends the signal to the second base transceiver that performs a reverse process. Finally, the signal is sent by the second base transceiver to the indoor portable handset. The double baseband processing by this type of FSR doubles an already existing speech delay. This type of FSR is expensive and, therefore, is not feasible for use in a mass market application.

A second known method utilizes an inexpensive FSR which does not possess any demodulation or error correction/speech processing capabilities. A base transceiver transmits a signal at a first frequency and the portable handset receives the signal at a second frequency. In order to avoid co-channel interference, the second frequency assigned to indoor operations must be different from the first frequency assigned to outdoor operation.

The portable handset may receive a message on the second frequency to move to a traffic channel (time slot) on the first frequency and attempt to do so. Since the indoor power of the signal on the first frequency is very low due to the attenuation property of the building, the portable handset will attempt to report that condition to the base transceiver. It is possible that the base transceiver will not receive the message; however, if the base transceiver does receive the low power message, the base transceiver will assign another of its channels to the portable handset. Since none of the base transceiver's channels operate on the second frequency, the assignment will not succeed.

As referenced above, the known prior art fails to disclose an inexpensive cellular WLL. Consequently, a need has developed to provide a wireless local loop system and method as referenced above which may be practically and economically implemented for use by single and multi-family dwellings and multi-use building environments.

It is further desirable that such a system be compatible with existing digital cellular radio communications. Finally, such a system should neither require the allocation of more radio frequencies than are currently allocated to wireless communication systems, nor require a substantial portion of existing wireless frequencies.

DISCLOSURE OF THE INVENTION

It is thus a general object of the present invention to overcome the limitations of the prior art by providing a cellular wireless local loop for use in single and multi-family dwellings and multi-use building environments which utilizes cellular radio communications.

Yet another object of the present invention is the provision of a digital wireless local loop that provides cellular services to indoor users utilizing the attenuation properties of buildings.

In carrying out the above objects and other objects of the present invention, a method is disclosed for providing a digital wireless local loop for use by a wireless transceiver in an indoor environment utilizing an outdoor macrocell base transceiver.

The method begins with the step of determining whether the portable handset is located in an indoor environment or an outdoor environment. When the portable handset registers its location with a corresponding home or visitor location register of the Mobile Telephone Switching Center, the portable handset also registers its operating environment, i.e., indoor environment or outdoor environment. A central call processor then generates an indoor or outdoor location signal accordingly.

Communication signals are transmitted between the base transceiver and the portable handset over one of a first plurality of frequencies in response to a generated outdoor location signal. Also, the portable handset is inhibited from transmitting or receiving communication signals over frequencies other than the first plurality of frequencies.

If an indoor location signal is generated, the method continues with the step of transmitting communication signals at the base transceiver and the portable handset over one of a second plurality of frequencies. The second plurality of frequencies is different from the first plurality of frequencies.

Next, the method continues with the step of converting the communication signals transmitted by the base transceiver and the portable handset to a predetermined conversion frequency. The predetermined conversion frequency is also different from the first and second plurality of frequencies.

The method continues with the step of transmitting the converted communication signal between the base transceiver and the portable handset.

Finally, the method concludes with the step of converting the communication signal received at the predetermined conversion frequency to one of the second plurality of frequencies for receipt by the base transceiver and the portable handset.

In further carrying out the above objects and other objects, features and advantages of the present invention, a system is also provided for carrying out the steps of the above described method.

The system includes a processor for determining whether the portable handset is located in an indoor environment or an outdoor environment and for generating a corresponding indoor or outdoor location signal in response thereto.

The system also includes a base transceiver located in one of a plurality of cells which define a cellular service area. The base transceiver is in communication with the processor and a portable handset, and it operates to communicate with the portable handset over a plurality of frequencies assigned to the base transceiver.

Upon receiving an outdoor location signal, the base transceiver transmits and receives communication signals to and from the portable handset over one of a first plurality of frequencies.

However, upon receiving an indoor location signal, the base transceiver transmits and receives communication signals over one of the second plurality of frequencies.

The system further includes a first converter in communication with the base transceiver for receiving communication signals over one of the second plurality of frequencies and retransmitting the communication signals over a predetermined conversion frequency. The first converter also receives communications over the predetermined conversion frequency and retransmits the communication signals over one of the second plurality of frequencies to the base transceiver.

The system also includes a second converter in communication with the first converter and a portable handset for receiving communication signals from the first converter over the predetermined conversion frequency and retransmitting the communication signals over the one of the second plurality of frequencies to the portable handset. The second converter also receives communication signals at the one of the second plurality of frequencies from the portable handset and retransmits the communication signals over the predetermined conversion frequency for receipt by the first converter.

The system finally includes an inhibitor in communication with the portable handset for inhibiting the portable handset from transmitting or receiving communication signals over frequencies other than the first plurality of frequencies when the portable handset is located in an outdoor environment.

The above objects, features and advantages of the present invention, as well as others, are readily apparent from the following detailed description of the best mode for carrying out the invention when taken in connection with the accompanying drawings, wherein like reference numbers correspond to like components.

BRIEF DESCRIPTION OF THE DRAWINGS

The present invention will be apparent from the detailed description taken in conjunction with the accompanying drawings in which.

BEST MODES FOR CARRYING OUT THE INVENTION

Figure 1:
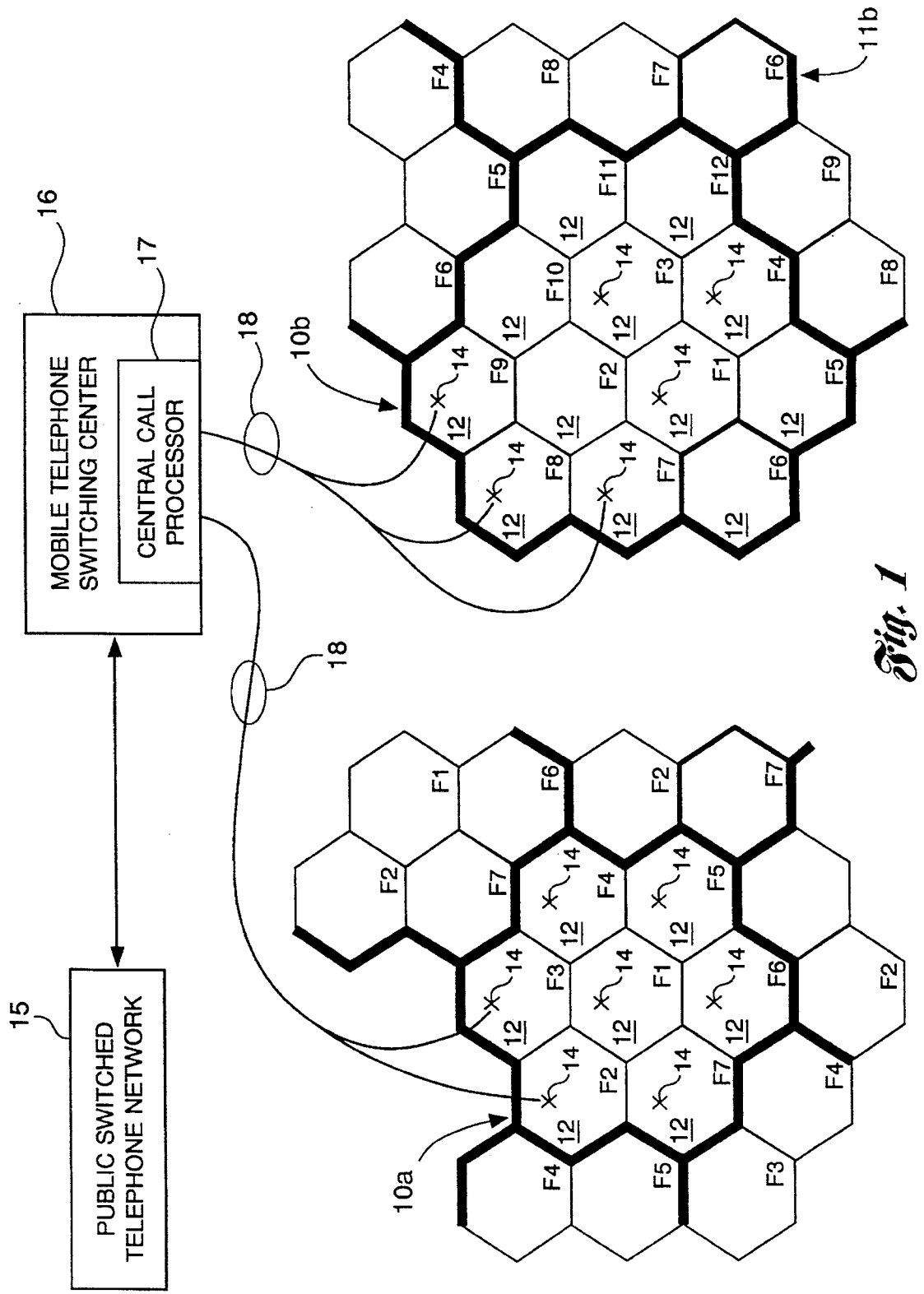
FIG. 1 is a schematic diagram of a prior art cellular telephone system illustrating typical layouts of cellular service areas.
Figure 2:
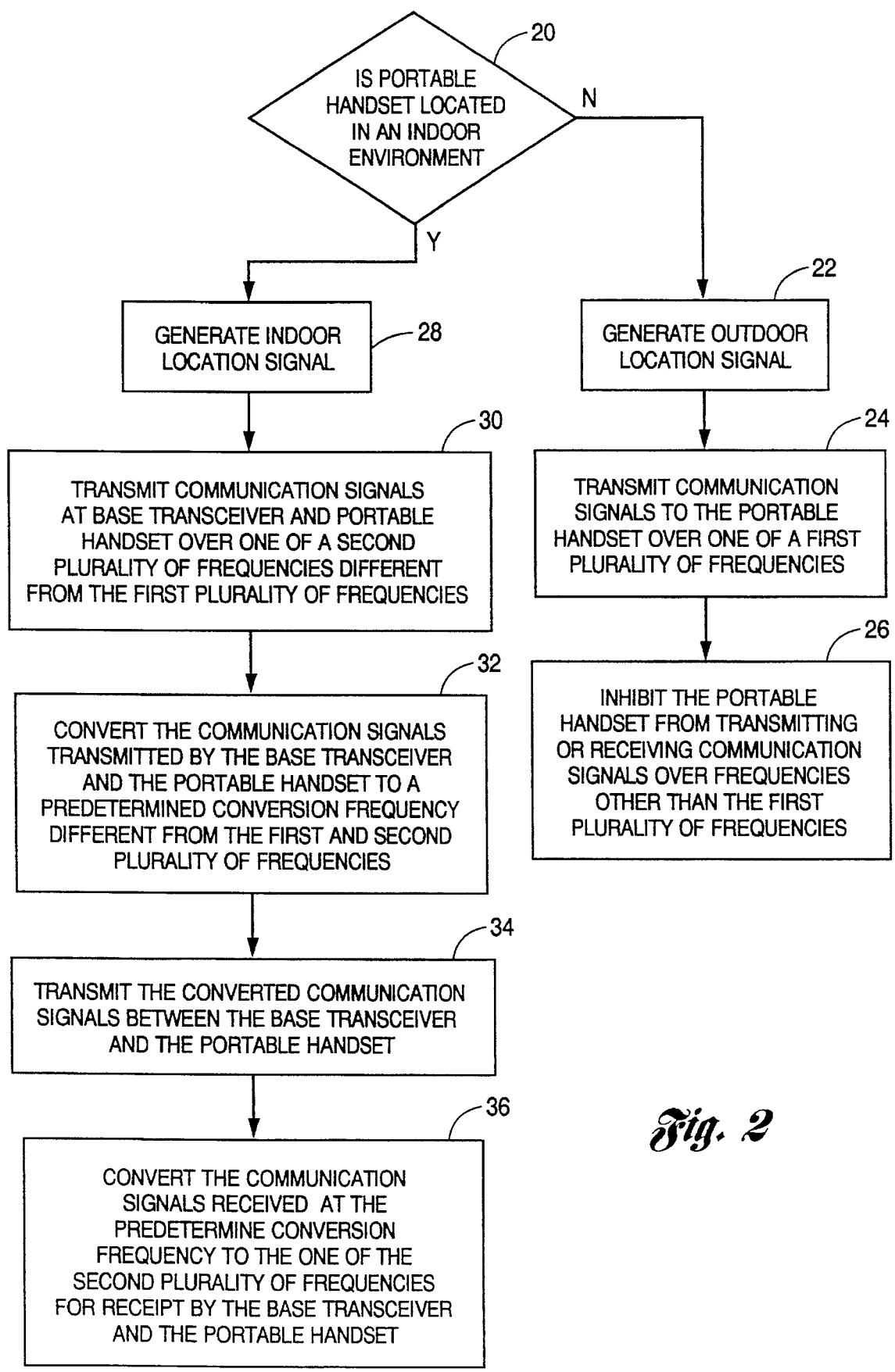
FIG. 2 is a block diagram illustrating the general sequence of steps associated with the operation of the present invention.

With reference to FIG. 2 of the drawings, there is provided a block diagram illustrating the sequential steps associated with the operation of the present invention when a telephone call to a wireless transceiver originates from either another portable handset or a land-based telephone via a Public Switched Telephone Network (PSTN).

The central call processor 17 transmits the signal over a dedicated line 18 (such as a land-based line or microwave link, etc.) to the appropriate base transceiver 14 based on the location of the portable handset. The central call processor 17 also transmits information to the base transceiver 14 indicating whether the portable handset is located in an indoor environment or an outdoor environment.

A portable handset located in an indoor environment requires service from a base transceiver 14 located outdoors. The indoor portable handset can communicate directly with an outdoor base transceiver 14 if both the base transceiver 14 and the portable handsets are allowed to exert sufficient power to penetrate the walls of a building. However, the more power a base transceiver 14 or a wireless transceiver transmits the more interference it causes to other base transceivers 14 as well as the associated portable handsets which are assigned the same frequencies.

An outdoor base transceiver 14 is assigned a plurality of predetermined frequencies for transmitting communication signals outdoors. The predetermined plurality of frequencies are within the frequency band constituting the cellular radio spectrum of segments 10a, 10b. The predetermined frequencies of a base transceiver 14 located in a cell are different from the predetermined frequencies of a base transceiver located in an adjacent cell. The communication signal may be either an audio, data or video signal.

As shown by block 20, the first step of the present invention includes determining whether the portable handset is located in an indoor environment or an outdoor environment.

If the portable handset has informed the local location register that it is operating in an outdoor environment, the processor 17 generates an outdoor location signal for receipt by the base transceiver 14, as shown by block 22.

Upon receiving the outdoor location signal, the base transceiver 14 transmits the communication signal to the portable handset over one of a first plurality of frequencies as shown by block 24. Also, the portable handset is inhibited from transmitting or receiving communication signals over frequencies other than the first plurality of frequencies, as shown by block 26.

If the portable handset has informed the local location register that it is operating in an indoor environment, the processor 17 generates an indoor location signal, as shown by block 28.

Upon receiving the indoor location signal, the base transceiver 14 and the portable handset transmit the communication signal over one of a second plurality of frequencies, as shown by block 30. The second plurality of frequencies is different from any of the first plurality of frequencies assigned to the base transceiver 14. The second plurality of frequencies corresponds to a predetermined plurality of frequencies assigned to a base transceiver in an adjacent cell 12.

Next, as shown by block 32, the method continues with the step of converting the frequency of the communication signal to a predetermined conversion frequency. The predetermined conversion frequency is different from the first and second plurality of frequencies, yet it is still one of the predetermined plurality of frequencies assigned to the base transceiver 14.

The first and second plurality of frequencies are a dynamically changing set of channels. As most of the communication traffic occurs outdoors during the day, a majority of the channels are assigned to the first plurality of frequencies to support outdoor service. However, as communication traffic shifts indoors towards the night, more channels are assigned to the second plurality of frequencies to support indoor service. The repartitioning of the available channels (resources) allows more channels to be accessed during peak traffic, and, hence, higher paying customers.

The method proceeds with the step of transmitting the communication signal over the predetermined conversion frequency between the base transceiver and the portable handset, as shown by block 34.

Finally, as shown by block 36, the method concludes with the step of converting the communication signal received at the predetermined conversion frequency to one of the second plurality of frequencies for receipt by the base transceiver and the portable handset.

The method disclosed describes the process of transmitting a signal from a base transceiver to a portable handset, as well as the process of transmitting a signal from the portable handset to the base transceiver.

Figure 3:
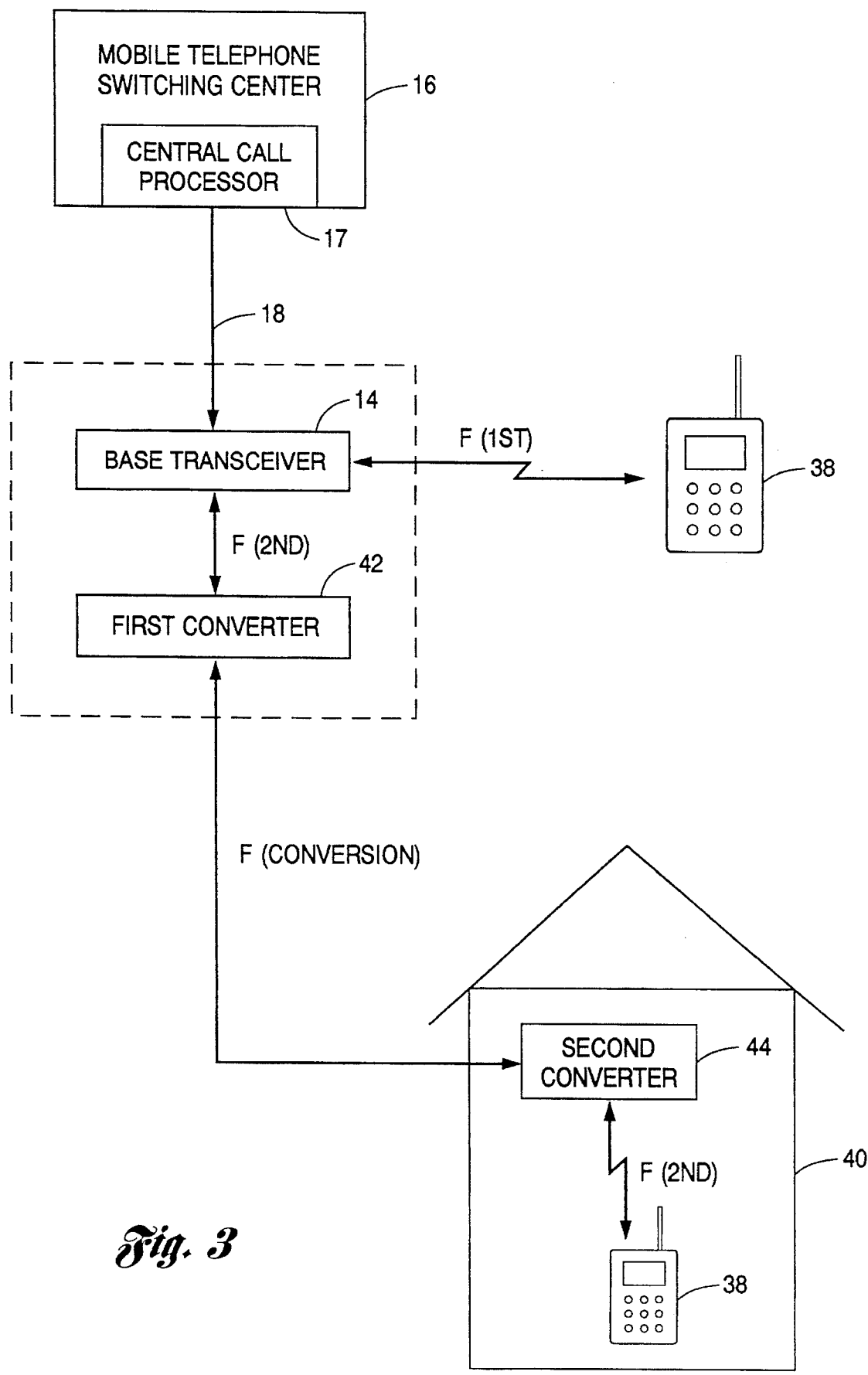
FIG. 3 is a block diagram of the preferred embodiment of the present invention.

Referring now to FIG. 3, there is shown a digital wireless local loop ("WLL") made in accordance with the teachings of the present invention. As shown, the WLL consists of a base transceiver 14. The base transceiver 14 transmits and receives communication signals to and from a portable handset at predetermined plurality of frequencies. The predetermined plurality of frequencies are disposed within a predetermined frequency band constituting a portion of the predefined wireless and preferably cellular radio spectrum.

Upon receiving an outdoor location signal from the processor 17, the outdoor base transceiver 14 transmits and receives communication signals to and from a portable handset 38 over one of a plurality of frequencies, F(1st).

For portable handsets 34 located in an indoor environment 40, such as a house or office building, the base transceiver 14 receives an indoor location signal and first transmits the communication signal to a first converter 42 over one of a second plurality of frequencies, F(2nd). The second plurality of frequencies F(2nd) is different from any of the predetermined plurality of frequencies utilized by the base transceiver 14 when communicating to portable handsets 38 located in the outdoor environment. The second plurality of frequencies, F(2nd), corresponds to a predetermined plurality of frequencies assigned to a base transceiver disposed in an adjacent cell 12. The base transceiver 14 also receives communication signals from the first converter 42 over one of the second plurality of frequencies.

The first converter 42 converts the frequency of the communication signal from one of the second plurality of frequencies, F(2nd), to a predetermined conversion frequency, F(conversion). The first converter 42 may be any conventional device known by one skilled in the art that changes the frequency of a signal to a second different frequency. The first converter 42 does not change the content of the message being transmitted or received. Therefore, there is no delay due to modulation and demodulation as well as baseband speech processing or control channel processing. The first converter 42 is disposed at the base transceiver 14.

The first converter 42 is further adapted to receive communication signals over the predetermined conversion frequency and to retransmit the signals to the base transceiver 14 over one of the second plurality of frequencies.

The first converter 42 transmits the communication signal over the predetermined conversion frequency for receipt by a second converter 44. The second converter 44 receives the signal over the predetermined conversion frequency and retransmits the signal at one of the second plurality of frequencies, F(2nd) for receipt by the portable handset 38. The second converter 44 is located in the indoor environment 40.

The second converter 44 is also adapted to receive communication signals from the portable handset 38 over one of the second plurality of frequencies and to retransmit the signal to the first converter 42 over the predetermined conversion frequency.

Preferably, the second converter 44 is a frequency shifting repeater (FSR). Since the digital signal is retransmitted using only a different frequency, there is no change in the content of the message being transmitted or received nor is there a need to decipher the content of the message. Consequently, there is no delay due to modulation and demodulation as well as baseband speech processing or control channel processing.

The double frequency conversion of the communication signal eliminates the frequency confusion experienced by a portable handset 38 located in an indoor environment 40. However, the portable handset 38 located in the outdoor environment experiences frequency confusion. If the outdoor portable handset 38 receives signals over the predetermined conversion frequency, the handset 38 may receive a message from the base transceiver 14 instructing the handset 38 to tune to a channel on one of the second plurality of frequencies, F(2nd), which is not available to the handset 38.

Therefore, the outdoor portable 38 has to be inhibited from transmitting and receiving signals to and from the base transceiver 14 over frequencies other than the first plurality of frequencies. The handset 38 may be inhibited utilizing an indoor/outdoor switch in the portable handset 38. The switch can be a physical button, or a smart card Subscriber IdentityModule (SIM) specifically designated for indoor or outdoor use.

A practical application of the above identified method and system can be illustrated in connection with a GSM or DCS-1800 system. The SIM utilized in these systems would contain, among many other information, information that assigns a portable handset user to one of several network or classes of subscribers, whereby indoor and outdoor wireless services are distinguished.

For example, a customer can subscribe to outdoor service only. That customer will then be issued a single "outdoor" only SIM that forbids the portable to respond to the base transceiver over frequencies other than the first plurality of frequencies. Since a subscriber is not usually confined to a single cell, the first plurality of frequencies utilized for outdoor communications by a base transceiver 14 must be assigned according to a frequency reuse pattern. This assignment is usually accomplished via the central processor 17.

A customer that subscribes to cordless (indoor) service only will be issued an "indoor" SIM that allows the portable to respond to the base transceiver over one of the second plurality of frequencies only and forbids it from responding to the base transceiver at one of the first plurality of frequencies.

A customer that subscribes to both outdoor mobile and indoor cordless services will be issued either two physical cards or a single double edged "indoor"/"outdoor" SIM. When the "outdoor" edge is inserted into the portable, the SIM will forbid the portable to listen to any "indoor" communications. When the customer walks indoors, he will have to pull the SIM out from the portable and reinsert it with the "indoor" edge facing the portable.

If a customer is charged according to the amount and quality/cost of network resources he or she is using then a clear customer hierarchy evolves. The highest revenue producer is the indoor/outdoor customer and the lowest revenue is collected from the cordless customer. The above described invention allows a preferential treatment of high paying customers during peak communication traffic hour(s) by partitioning more frequencies to the type of communication (i.e., indoor/outdoor) that occurs most during the peak hour(s).

For example, assume that during the day most communication traffic occurs outdoors. A majority of the frequencies within the predetermined frequency band assigned to the base transceiver are allotted for outdoor communications, i.e., the first plurality of frequencies, F(1st). As traffic shifts indoors towards the night, more frequencies are allotted for indoor communications, i.e., more frequencies are assigned to the second plurality of frequencies, F(2nd).

The second plurality of frequencies may be further partitioned to allow for distinguishing between a permanent indoor user, e.g., a cordless telephone, and a variable indoor user, e.g., mobile telephone. Since both types of subscribers will contend for the indoor frequencies, the network resources can be adjusted to allow more frequencies to be accessed by the higher paying customer.

while the beet modes for carrying out the invention have been described in detail, those familiar with the art to which this invention relates will recognize various alternative designs end embodiments for practicing the invention as defined by the following claims.

What is claimed is:

1. For use with one of a plurality of base transceivers located in one of a plurality of cells defining a cellular service area, each of the plurality of base transceivers having a plurality of frequencies assigned thereto, and one of the plurality of base transceivers operative to communicate with a portable handset at a first plurality of frequencies assigned to the one of the plurality of base transceivers, a method for providing a wireless local loop comprising:

determining whether the portable handset is located in an indoor environment or an outdoor environment and generating an indoor or outdoor location signal in response thereto;

in response to a generated outdoor location signal, (a) transmitting communication signals between the base transceiver and the portable handset at one of the first plurality of frequencies, and (b) inhibiting the portable handset from transmitting or receiving communication signals at frequencies other than the first plurality of frequencies; and in response to a generated indoor location signal, (a) transmitting communication signals at one of the base transceiver and the portable handset at one of a second plurality of frequencies different from the first plurality of frequencies, the second plurality of frequencies corresponding to one of the plurality of frequencies assigned to another one of the plurality of base transceivers located at another one of the plurality of cells, (b) converting the communication signals to a predetermined conversion frequency, the predetermined conversion frequency corresponding to another one of the first plurality of frequencies, (c) transmitting the converted communication signals to an indoor environment base transceiver and the portable handset at the predetermined conversion frequency, and (d) converting the communication signals received at the predetermined conversion frequency to the one of the second plurality of frequencies for receipt by the indoor environment base transceiver and the portable handset.

2. The method of claim 1 wherein the first and second plurality of frequencies comprise a portion of the cellular radio spectrum.

3. The method of claim 1 wherein the communication signals are audio signals.

4. The method of claim 1 wherein the communication signals are video signals.

5. The method of claim 1 wherein the communication signals are data signals.

6. The method of claim 1 wherein the first and second plurality of frequencies are selected based upon an amount of indoor and outdoor location signals generated.

7. The method of claim 1 wherein the step of converting the communication signals to the predetermined conversion frequency is performed at the base transceiver.

8. The method of claim 1 wherein the plurality of base transceivers are in communication with a mobile telephone switching center having a central call processor and wherein the step of determining whether the portable handset is located in an indoor environment or an outdoor environment is performed by the central call processor.

9. For use with a plurality of base transceivers, each of the plurality of base transceivers located in one of a plurality of cells defining a cellular service area and having a plurality of frequencies assigned thereto, and a portable handset adapted to transmit and receive communication signals to one of the plurality of base transceivers, a wireless local loop, comprising:

a processor for determining whether the portable handset is located in either an indoor or outdoor environment and for generating a corresponding indoor or outdoor location signal in response thereto;

the one of the base transceivers provided in communication with the processor and the portable handset and operative to communicate with the portable handset at a first plurality of frequencies assigned thereto by (a) transmitting and receiving communication signals to and from the portable handset at one of the first plurality of frequencies upon receiving the outdoor location signal, and (b) transmitting and receiving communication signals at one of a second plurality of frequencies upon receiving the indoor location signal, the second plurality of frequencies corresponding to one of the plurality of frequencies assigned to another one of the plurality of base transceivers located at another one of the plurality of cells;

a first converter in communication with the one of the base transceivers for receiving communication signals at the one of the second plurality of frequencies and retransmitting the communication signals at a predetermined conversion frequency corresponding to another one of the first plurality of frequencies, the first converter further operative for receiving communication signals at the predetermined conversion frequency and retransmitting the communication signals at the one of the second plurality of frequencies to the base transceiver;

a second converter in communication with the first converter and the portable handset for receiving communication signals from the first converter at the predetermined conversion frequency and for retransmitting the communication signals at the one of the second plurality of frequencies to the portable handset, the second converter further operative for receiving communication signals at the one of the second plurality of frequencies from the portable handset and retransmitting the communication signals at the predetermined conversion frequency to the first converter; and an inhibitor in communication with the portable handset for inhibiting the portable handset from transmitting or receiving communication signals at frequencies other than the first plurality of frequencies in response to the generation of the outdoor location signal.

10. The system of claim 9 wherein the first converter is located at the base transceiver.

11. The system of claim 9 wherein the first converter transmits and receives communications signals to and from the base transceiver via a wireline link.

12. The system of claim 9 wherein the second converter is located in the indoor environment.

13. The system of claim 9 wherein the second converter comprises a frequency shifting repeater.

14. The system of claim 9 wherein the inhibitor is a switch.

15. The system of claim 14 wherein the switch is a physical button disposed on the portable handset.

16. The system of claim 14 wherein the switch is at least one electronic module adapted to be inserted into the portable handset in order to operate the portable handset in either the indoor environment or the outdoor environment.

17. The system of claim 16 wherein the at least one electronic module provides operation of the portable handset in both the indoor environment and the outdoor environment.

* * * * *